US009518155B2

(12) United States Patent
Cheng et al.

(10) Patent No.: US 9,518,155 B2
(45) Date of Patent: Dec. 13, 2016

(54) FLUOROPOLYMER COMPOSITIONS

(75) Inventors: Shujing Cheng, Shanghai (CN);
Arnaud Bourdette, Chelles (FR)

(73) Assignee: Rhodia Operations, Paris (FR)

( * ) Notice: Subject to any disclaimer, the term of this patent is extended or adjusted under 35 U.S.C. 154(b) by 0 days.

(21) Appl. No.: 14/394,271

(22) PCT Filed: Apr. 16, 2012

(86) PCT No.: PCT/CN2012/074101
§ 371 (c)(1),
(2), (4) Date: Nov. 25, 2014

(87) PCT Pub. No.: WO2013/155659
PCT Pub. Date: Oct. 24, 2013

(65) Prior Publication Data
US 2015/0083025 A1    Mar. 26, 2015

(51) Int. Cl.
| | |
|---|---|
| *C08J 3/09* | (2006.01) |
| *C08K 5/20* | (2006.01) |
| *C08K 5/41* | (2006.01) |
| *C08J 11/06* | (2006.01) |
| *C09D 7/00* | (2006.01) |
| *C09D 127/16* | (2006.01) |
| *H01M 4/62* | (2006.01) |
| *H01M 10/0525* | (2010.01) |

(52) U.S. Cl.
CPC .............. *C08J 3/096* (2013.01); *C08J 3/095* (2013.01); *C08J 3/097* (2013.01); *C08J 11/06* (2013.01); *C08K 5/20* (2013.01); *C08K 5/41* (2013.01); *C09D 7/001* (2013.01); *C09D 127/16* (2013.01); *H01M 4/623* (2013.01); *H01M 10/0525* (2013.01); *C08J 2327/12* (2013.01); *C08J 2327/16* (2013.01); *Y02E 60/122* (2013.01)

(58) Field of Classification Search
USPC ........................................... 252/364; 521/40
See application file for complete search history.

(56) References Cited

U.S. PATENT DOCUMENTS

| | | | |
|---|---|---|---|
| 5,043,328 A | 8/1991 | Weithmann | |
| 5,434,899 A | 7/1995 | Huq et al. | |
| 6,358,901 B1 * | 3/2002 | Joye | C09D 9/005 134/38 |
| 6,656,896 B2 * | 12/2003 | Lallier | C09D 9/005 134/38 |
| 7,700,225 B2 | 4/2010 | Jung et al. | |
| 2005/0048368 A1 * | 3/2005 | Jung | H01M 10/052 429/217 |
| 2013/0250485 A1 * | 9/2013 | Kaye | H01M 10/052 361/502 |

FOREIGN PATENT DOCUMENTS

| | | |
|---|---|---|
| CN | 1220210 A | 4/1996 |
| CN | 1277236 A | 12/2000 |
| CN | 1591939 A | 3/2005 |
| CN | 101045806 A | 10/2007 |
| CN | 100411232 C | 8/2008 |
| JP | 2002246029 A | 8/2002 |
| JP | 2005072009 A | 3/2005 |
| KR | 20030047038 A | 6/2003 |
| KR | 20050023179 A | 3/2005 |
| KR | 20090121650 A | 11/2009 |
| WO | WO-02/073720 A2 * | 9/2002 |
| WO | WO 02073720 A2 | 9/2002 |
| WO | WO-2010/084159 A1 * | 7/2010 |
| WO | WO-2012/079231 A1 * | 6/2012 |

OTHER PUBLICATIONS

Chen, Zonghai, et al—"Mechanical and Electrical Properties of Poly(vinylidene fluoride-tetrafluoroethylene-propylene)/Super-S Carbon Black Swelled in Liquid Solvent as an Electrode Binder for Lithium-Ion Batteries", 2004, Journal of Applied Polymer Science, vol. 91, p. 2958-2965; Wiley Periodicals, Inc.; 8 pgs.

Hwang Yun Ju, et al—"Poly(vinylidene fluoride-hexafluoropropylene)-based membranes for lithium batteries", 2008, Journal of Membrane Science, vol. 310, pp. 349-355, Elsevier, Science Direct, 7 pgs.

\* cited by examiner

*Primary Examiner* — Peter D Mulcahy
*Assistant Examiner* — Henry Hu
(74) *Attorney, Agent, or Firm* — Osha Liang LLP

(57) ABSTRACT

The present invention relates to a composition for solubilizing a fluoropolymer, comprising a solvent blend of a) compound of formula (I) $R^1$—C(=O)—$NR^2R^3$ wherein $R^1$ and $R^2$ and $R^3$ are defined as in the specification and b) dimethylsulfoxide (DMSO). The invention also relates to the process for the preparation of the composition and its uses. The invention is also the use of the fluoropolymer composition for coating applications.

11 Claims, No Drawings

FLUOROPOLYMER COMPOSITIONS

CROSS-REFERENCE TO RELATED APPLICATIONS

The present application is a U.S. national stage entry under 35 U.S.C. §371 of International Application No. PCT/CN2012/074101 filed Apr. 16, 2012, the whole content of this application being herein incorporated by reference for all purposes.

FIELD OF THE INVENTION

The present invention relates to a composition for solubilizing a fluoropolymer. The invention also relates to the obtained fluoropolymer composition, the process for its preparation and its uses. The invention is also of use the fluoropolymer composition for coating applications.

BACKGROUND OF THE INVENTION

Fluoropolymers such as polytetrafluoroethylene, polyvinylidene fluoride are encountered in numerous technical fields.

Polytetrafluoroethylene (PTFE), a synthetic fluoropolymer of tetrafluoro-ethylene is used as a non-stick coating for pans and other cookware; as an insulator in cables and connector assemblies and as a material for printed circuit boards used at microwave frequencies. It is often used in containers and pipework for reactive and corrosive chemicals.

Polyvinylidene fluoride (PVDF) is available as piping products, sheet, tubing, films, plate, membranes, powder coatings, foams and wiring insulator. It can be injected, molded or welded and is commonly used in the chemical, semiconductor, photovoltaic panels, as well as in lithium ion batteries.

A step in which the fluoropolymer is solubilized is sometimes present in the different applications, particularly when the fluoropolymer is used in batteries, or to make membranes for water filtration.

With the increasing demand for battery-powered electronic equipment, there exists a corresponding increase in demand for rechargeable electrochemical cells having high specific energies.

Lithium-ion secondary batteries have high voltage and high capacity compared to conventional nickel cadmium secondary batteries. In particular, when lithium transition metal composite oxides such as $LiCoO_2$ and $LiMn_2O_4$ are used as cathode active material and carbonaceous materials such as graphite and carbon fiber are used as anode active materials, high voltage and high capacity can be achieved, and side effects such as short circuits do not occur. Thus, lithium secondary batteries are widely used as power sources for mobile electronic devices such as cellular phones, notebook computers, digital cameras, etc.

Lithium secondary batteries are generally prepared by applying on a metal film a slurry consisting of an active material and a polymeric binder, drying the slurry and pressing the film. Although various resins have been used as binder, fluorine-based resins such as polyvinylidene fluoride (PVDF), which adheres well to the material current collector and active material, is commonly used.

To prepare the slurry, the polymeric binder is usually dissolved in a solvent to form a solution having from about 1 to 15% binder in solvent. Binder solutions are typically formulated with N-methyl pyrrolidone (NMP). NMP is considered to be most effective.

However, the safety risks for the operators and the environment are a permanent concern. NMP will be labeled as Mutagen Cat 2/Reprotoxic R61 from June 2009 in Europe and NMP is subject to report in the Toxic Release Inventory (SARA title III section 313). There is a need for other solvents, presenting a good safety and/or environment profile.

In CN1277236-A and CN1120210-C, an adhesive formula is developed which consists of polyvinylidene fluoride resin 3-15 wt %, N-methyl pyrrolidone or dimethyl acetamide 85-95 wt %, and γ-aminopropyl triethoxy silicone, γ-propyl methacrylate trimethoxy silicone or ethylamino amidopropyl trimethoxy silicone as coupling agent 1-5 wt %.

US2005048368-A1, JP2005072009-A, CN1591939-A, KR2005023179-A and CN100411232-C relate to a separator formula; the employed organic solvent is consisting of dimethylformamide, dimethylsulfoxide, dimethylacetate, acetone, and/or N-methyl-2-pyrrolidine. Dimethylacetamide, dimethylformamide are also classified as CMR (carcinogen/mutagen/reprotoxic).

KR2003047038-A develop composite binder for lithium battery. The composite electrode binder comprises polyvinylidene fluoride (PVDF) and polyimide. Preferably the polyimide is 20% polyimide solution prepared by mixing pyromellitic dianhydride and 4,4'-diaminophenyl ether in the ratio of 1/1 and dissolving the mixture in N-methylpyrrolidone.

JP2002246029-A, WO200273720-A2, AU2002257642-A1 and AU2002257642-A8 describe a new binder composition comprising fluoro-resin-A which dissolves in a specific organic solvent and resin-B which totally or partially does not dissolve in the organic solvent. Fluoro-resin-A comprises fluoro-polymer-A1 whose 8 wt. % N-methylpyrroldinone solution has a viscosity of 0.3-20 Pa·s and fluoropolymer-A2 in which polar groups are incorporated. The weight ratio of NB is 99/1 to 1/99.

Poly(vinylidene fluoride-hexafluoropropylene)-based membranes for lithium batteries are disclosed in *Journal of Membrane Science* (2008), 310(1+2), 349-355. Poly(vinylidene fluoride-hexafluoropropylene) (PVdF-HFP) copolymer membranes are prepared by phase inversion with poly(ethylene glycol) as additive and with THF, acetone or DMF as solvents.

Mechanical and electrical properties of poly(vinylidene fluoride-tetrafluoroethylene-propylene)/Super-S carbon black swelled in liquid solvent as an electrode binder for lithium-ion batteries are disclosed in *Journal of Applied Polymer Science* (2004), 91(5), 2958-2965.

In the different applications, there is a need for finding solvents with a better health, safety and environment profile in order to prepare solutions of fluoropolymers.

BRIEF SUMMARY OF THE INVENTION

This aim and others are achieved by means of the present invention, the subject of which is therefore a composition, notably for solubilizing a fluoropolymer, comprising a solvent blend of at least:

a) Compound of formula (I):

$$R^1C(=O)NR^2R^3 \qquad (I)$$

wherein:

$R^1$ is hydrogen or an aliphatic saturated group, that can be linear or branched, having 1 to 6 carbon atoms, eventually substituted by one or more functional groups such as —OH, —OR, —C(=O)OR and —C(=O)NR$^4$R$^5$, R being an alkyl group having 1 to 6 carbon atoms, and R$^4$ and R$^5$, identical or different, being methyl or ethyl groups;

R$^2$ and R$^3$, identical or different, being methyl or ethyl groups;

R$^1$ and R$^2$ and R$^3$ being able to form a cycle comprising 4 to 6 carbon atoms eventually substituted by one or more functional groups such as —OH, —OR, —C(=O)OR and —C(=O)NR$^4$R$^5$, R being an alkyl group having 1 to 6 carbon atoms, and R$^4$ and R$^5$, identical or different, being methyl or ethyl groups; and b) DiMethylSulfoxide (DMSO).

The solvent blend used in the invention presents a good HSE profile with no CMR chemicals. Therefore, risks to human health and environment are sharply decreased. Then present invention makes possible the solubilization of a fluoropolymer with solvents which are not labeled CMR. The solvent blend has a good solvency power for the fluoropolymer.

The solvent blend has a freezing point lower than the one of DMSO and very convenient for the applications. It is very advantageous because the freezing point of DMSO is high (18° C.) close to room temperature which can involve freezing. Moreover, the blend of the present invention is soluble in water.

Another subject of the invention is also the obtained composition comprising a solubilized fluoropolymer and the solvent blend as described, and possibly odor mask and/or anti-freezing agent.

The term "fluoropolymer composition" will be used in the present invention to define this obtained composition. The fluoropolymer composition obtained according to the invention can be under a solution form or a gel form.

"A gel" is a solid composed of at least two components, one of which (polymer) forms a three-dimensional network in the medium of the other component (solvents), wherein the minimum amount of the liquid is sufficient for ensuring the elastic properties of the gel. A general feature of physical gels is the existence of the yield point.

Thus, the present invention proposes a solvent blend for preparing a solution and/or a gel of a fluoropolymer.

In the context of the invention, the term "solution" is intended to embrace "gel".

The invention also concerns the composition comprising the solubilized fluoropolymer and the process for its preparation.

The invention also concerns the use of this composition in order to prepare a membrane or a coating on any substrate and particularly as a binder polymer for coating a battery material.

DETAILED DESCRIPTION OF THE INVENTION

A subject of the present invention is a composition for solubilizing a fluoropolymer, as described.

Another subject of the present invention is a fluoropolymer composition comprising a solubilized fluoropolymer and the solvent blend as described.

The composition comprises typically from 0.1 to 15% by weight of the fluoropolymer.

The composition has generally a viscosity of lower than 1000 cP at room temperature, preferably at 27° C.

When the fluoropolymer is PVDF, the obtained solutions of PVDF in the solvent blend of the invention, have preferably a viscosity in the range of 250 to 400 cP, more preferably 300 to 400 cP at room temperature.

Fluoropolymer

The polymer involved in the composition of the invention is a fluoropolymer.

Regarding the fluoropolymer, this denotes any polymer having in its chain more than 50%, preferably more than 75%, by weight of at least one fluoromonomer chosen from the monomers containing a vinyl bond capable of opening in order to be polymerized and that contains, directly attached to this double bond, at least one fluorine atom, one fluoroalkyl group or one fluoroalkoxy group.

The fluoropolymer may be a homopolymer or a copolymer at least partly derived from olefinic monomers completely substituted by fluorine atoms or completely substituted by a combination of fluorine atoms and of at least one of chlorine, bromine and iodine atoms per monomer.

Examples of fluoro homo- or copolymers are polymers or copolymers derived from tetrafluoroethylene, hexafluoropropylene, chlorotrifluoroethylene and bromotrifluoroethylene.

Such fluoropolymers may also contain recurring units derived from other ethylenically unsaturated monomers containing at least as many fluorine atoms as carbon atoms, such as, for example, vinylidene fluoride, trifluoroethylene and vinyl perfluoroalkyl ethers such as perfluoro(methylvinyl) ether or perfluoro(ethylvinyl) ether.

Polyvinylidenefluoride (PDVF) polymers (homopolymer or copolymers thereof) are especially preferred.

The fluoropolymer can be a copolymer of vinylidene fluoride (VDF) with comonomers such as hexafluoropropylene (HFP) and/or chlorotrifluoroethylene (CTFE). The comonomer is advantageously HFP.

The PVDF contains, by weight, at least 50% of VDF, more preferentially at least 75% and even more preferentially at least 85%.

The amount of comonomer can be typically of from 0-25%, preferably 0-10% by weight.

Examples of such appropriate PVDF polymers include Kynar 301F, Kynar 741 and Kynar 461, available from Arkema and Solef 6020 and Solef 5130, available from Solvay.

The fluoropolymer may be a homopolymer or a copolymer, it may also comprise unfluorinated monomers such as ethylene or propylene in quantities preferably less than 25%.

The present invention includes the case where the fluoropolymer is mixed with minor quantities (less than 50 wt %) of another polymer such as polyurethane, polyethylene oxide, polyacrylonitrile, polymethylacrylate, polyacrylamide, polyvinylacetate, polyvinylpyrrolidone, glycol diacrylate and combinations thereof.

Solvent

The weight ratio between the compound of formula (I) and DMSO is preferably of from 1/99 to 99/1, preferably of from 20/80 to 80/20, preferably of from 70/30 to 30/70. These ratios allow good properties as well a good HSE profile.

The solvent blend can comprise further solvents.

Examples of further solvents include:

aliphatic hydrocarbons including, more particularly, the paraffins such as, in particular, pentane, hexane, heptane, octane, nonane, decane, undecane, dodecane or cyclohexane, and naphthalene and aromatic hydrocarbons and more particularly aromatic hydrocarbons such as, in particular, benzene, toluene, xylenes, cumene, petroleum fractions composed of a mixture of alkylbenzènes, aliphatic or aromatic halogenated hydrocarbons including more particularly, perchlorinated hydrocarbons such as, in particular, tetrachloroethylene, hexachloroethane; partially chlorinated hydrocarbons such as dichloromethane, chloroform, 1,2-dichloroethane, 1,1,1-trichloroethane, 1,1,2,2-tetrachloroethane, pentachloroethane, trichloroethylene, 1-chlorobutane, 1,2-dichlorobutane; monochlorobenzene, 1,2-dichlorobenzene, 1,3-dichlorobenzene, 1,4-dichlorobenzene, 1,2,4-trichlorobenzene or mixture of different chlorobenzenes, aliphatic, cycloaliphatic or aromatic ether oxides, more particularly, diethyl oxide, dipropyl oxide, diisopropyl oxide, dibutyl oxide, methyltertiobutylether, dipentyl oxide, diisopentyl oxide, ethylene glycol dimethyl ether, ethylene glycol diethyl ether, ethylene glycol dibutyl ether benzyl oxide; dioxane, tetrahydrofuran (THF), glycol ethers such as ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol mono-n-butyl ether, glycol ether esters such as ethylene glycol methyl ether acetate, ethylene glycol monoethyl ether acetate, ethylene glycol monobutyl ether acetate, alcohols such as methyl alcohol, ethyl alcohol, diacetone alcohol, ketones such as acetone, methylethylketone, methylisobutyl ketone, diisobutylketone, cyclohexanone, isophorone, linear or cyclic esters such as: isopropyl acetate, n-butyl acetate, methyl acetoacetate, dimethyl phthalate, γ-butyrolactone, linear or cyclic carboxamides such as N,N-dimethylacetamide (DMAC), N,N-diethylacetamide, dimethylformamide (DMF), diethylformamide or N-methyl-2-pyrrolidinone (NMP), organic carbonates for example dimethyl carbonate, diethyl carbonate, dipropyl carbonate, dibutyl carbonate, ethylmethyl carbonate, ethylene carbonate, vinylene carbonate, phosphoric esters such as trimethyl phosphate, triethyl phosphate, tributylethyl phosphate, ureas such as tetramethylurea, tetraethylurea.

The amount of further solvents is preferably or lower than the amount of the compound of formula (I) and/or of DMSO. The amount of further solvent is preferably of lower then 50% by weight, preferably of lower than 25% of the total amount of solvents.

In one embodiment of the invention, a low amount of further solvents is preferred.

In one embodiment of the invention, the solvent is chosen CMR free and substantially free of NMP, DMF, DMAC.

In one embodiment of the invention, the solvent is substantially free to further solvents.

Compound of Formula (I)

According to the present invention, the composition comprises at least a compound of formula (I):

$$R^1C(=O)NR^2R^3 \quad (I)$$

wherein:

$R^1$ is hydrogen or an aliphatic saturated group, that can be linear or branched, having 1 to 6 carbon atoms, eventually substituted by one or more functional groups such as —OH, —OR, —C(=O)OR and —C(=O)NR$^4$R$^5$, R being an alkyl group having 1 to 6 carbon atoms, and R$^4$ and R$^5$, identical or different, being methyl or ethyl groups;

$R^2$ and $R^3$, identical or different, being methyl or ethyl groups;

$R^1$ and $R^2$ and $R^3$ being able to form a cycle comprising 4 to 6 carbon atoms eventually substituted by one or more functional groups such as —OH, —OR, —C(=O)OR and —C(=O)NR$^4$R$^5$, R being an alkyl group having 1 to 6 carbon atoms, and R$^4$ and R$^5$, identical or different, being methyl or ethyl groups.

$R^1$ preferably represents an aliphatic acyclic and saturated group, linear or branched, having 1 to 6 carbon atoms. More preferably $R^1$ is an alkyl group having 1 to 6 carbon atoms. Alkyl groups may be methyl, ethyl, propyl, butyl, pentyl and hexyl. When these alkyl groups are branched or substituted, we can also cite isopropyl, tert-butyl, 2-ethylhexyl, 2-methylbutyl, 2-methylpentyl and 1-methylpentyl.

Hydrocarbonated chain may eventually be interrupted by one or more heteroatom such as O or S, or one or more functional group such as carbonyl, or carrying one or more substituent such as formyl.

$R^1$ may equally represent a cyclic group having 3 to 6 carbon atoms, more preferably 5 to 6 carbon atoms. Cyclopentyl or cyclohexyl groups are more preferred.

According to the present invention, when $R^1$ and $R^2$ or $R^1$ and $R^3$ form together a cycle, said cycle may equally comprise a —CON— group.

Compound of formula (I) wherein $R^1$ is a group of formula —Z—C(=O)OR', Z being a linear or branched divalent alkylene group comprising 2 to 5 carbon atoms and R' being an alkyl group comprising 1 to 4 carbon atoms, such as a methyl group, is preferred.

Compounds of formula (I) may also be compounds of formula MeO(O=)C—Z—C(=O)NR$^2$R$^3$, wherein Z, R$^2$ and R$^3$ are previously defined. Preferably, compounds of formula (I) are compounds of formula MeO(O=)C—Z—C(=O)NR$^2$R$^3$, wherein R$^2$ and R$^3$ are previously defined and Z is a branched alkyl group having 2 to 4 carbon atoms.

According to a preferred embodiment of the invention, the compound of formula (I) is a blend comprising:

a compound of formula (I) wherein $R^1$ is —CH(CH$_2$—CH$_3$)—CH$_2$—C(=O)OMe, a compound of formula (I) wherein $R^1$ is —CH$_2$—CH(CH$_2$—CH$_3$)—C(=O)OMe, a compound of formula (I) wherein $R^1$ is —CH(CH$_3$)—CH$_2$—CH$_2$—C(=O)OMe, and a compound of formula (I) wherein $R^1$ is —CH$_2$—CH$_2$—CH(CH$_3$)—C(=O)OMe.

Said blend may also comprise a compound of formula (I) wherein $R^1$ is —(CH$^2$)$_4$—C(=O)OMe.

Then, composition of the present invention may comprise a compound of formula (I) of formula MeO(O=)C—(CH$_2$)$_4$—C(=O)NR$^2$R$^3$, wherein R$^2$ and R$^3$ are previously defined.

Composition may also comprise a compound of formula (I) as follows: R$^4$R$^5$NC(=O)—Z—C(=O)NR$^2$R$^3$, wherein R$^2$, R$^3$, R$^4$ and R$^5$ are previously defined.

According to an other embodiment of the invention, $R^1$ is a hydrogen.

According to an other embodiment of the invention, $R^1$ is a 1-hydroxyethyl group.

According to an embodiment of the invention, $R^2$ and $R^3$ are methyl groups.

A particular family of compound (I) of the invention are then those ones of formula R$^1$C(=O)NMe$_2$.

According to an other embodiment of the invention, $R^1$ and $R^2$ may form together a cycle, said cycle having 4 carbon atoms, carbon atom of carbonyl being included and $R^3$ is a methyl group.

Compound of formula (I) may notably be produced according to a process defined in WO2009/092795.

Compound of formula (1) may be a blend of:
RO(O═)C—Z—C(═O)NR²R³; and
R⁴R⁵NC(═O)—Z—C(═O)NR²R³.

One of the preferred compounds of formula (I) is pentanoic acid, 5-(dimethylamino)-2-methyl-5-oxo-, methyl ester (CAS Number: 1174627-68-9), known as Rhodiasolv® Polarclean from Rhodia; wherein $R^2$═$R^3$═$CH_3$ and $R^1$═—Z—COOMe with Z is a branched alkylene C4 group.

Solvent Blend

The invention also concerns a mixture of solvents that is particularly useful for carrying out the invention.

The weight ratio between the compound of formula (I) and DMSO in the mixture (or blend) is of from 1/99 to 99/1, preferably of from 20/80 to 80/20, preferably of from 70/30 to 30/70.

The solvent can comprise further solvents than the compound of formula (I) and DMSO which are above described. The amount of further solvents is preferably or lower than the amount of the compound of formula (I) and/or of DMSO. The amount of further solvent is preferably of lower then 50% by weight, preferably of lower than 25% of the total amount of solvents.

The composition may also comprise odor a mask agents, such as compounds containing ester, aldehyde, alcohol, hydrocarbon and/or ketone. Odor mask can be included in the blend, the weight ratio between the compound of formula (I)/DMSO blend and the odor mask is preferable of from 0.1/99.9 to 1/99.

The composition may also comprise an anti-freezing agent, notably a glycol anti-freezing agent, such as for example ethylene glycol or propylene glycol. Anti-freezing agent can be included, the weight ratio between the compound of formula (I)/DMSO blend and the anti-freezing agent is preferable of from 1/99 to 10/90.

Process for Preparing the Fluoropolymer Composition

Another object of the invention is the process for the preparation of the composition comprising the fluoropolymer which is called "fluoropolymer composition".

The composition of the invention is prepared according a process comprising the steps of:
preparing the solvent blend by mixing a compound of formula (I) and dimethylsulfoxyde,
introducing the solvent blend into the fluoropolymer, under stirring,
heating the mixture at a temperature comprised between 15 and 100° C.

This operation is advantageously carried out from 30 to 80° C.

The temperature is maintained until solubilization of the fluoropolymer.

At the end of this step, the obtained composition is generally cooled down to room temperature.

According to another embodiment of the invention, the process for the preparation of the fluoropolymer composition comprises the steps of:
preparing the solvent blend by mixing a compound of formula (I) and dimethylsulfoxyde,
heating the solvent blend at a temperature comprised between 15 and 100° C.,
introducing the fluoropolymer into the solvent blend.

The temperature is maintained until solubilization of the fluoropolymer.

At the end of this step, the obtained composition is generally cooled down to room temperature.

Uses

The solvent blend of the present invention can be used every time a solvent route is preferred for the use of a fluoropolymer material, preferably PVDF.

Another application of the solvent blend of the invention, is in the field of recycling fluoropolymers, particularly PVDF. Thus, PVDF can be recovered from the backing of the photovoltaic panels and from wire coatings.

The fluoropolymer composition obtained from the solvent blend of the invention can be used for example, as a raw material for preparing a membrane or a foam or for coating a substrate, or as binder.

Examples of substrates which can be coated are metal (sheet, film, and wire), plastics, textiles, glass and so on.

The present invention also provides a process for coating a substrate comprising the steps of applying the fluoropolymer composition of the invention onto one or two sides of the substrate or parts thereof and removing the solvent.

The solvent removal can be obtained for example by evaporation by increasing the temperature or by phase inversion technique using an additional non-solvent, for example water.

One specific application is a process for preparing a coated battery separator.

The separator material may be composed of a porous polyolefin, preferably polyethylene, polypropylene, or a combination of the two, coated as described below.

Other possible separator materials include polytetrafuoroethylene, polystryrene, polyethyleneterephtalate, ethylenepropylene diene monomer (EPDM), nylon and combinations thereof.

The process of the invention for preparing a coated battery separator, comprises the steps:
providing a separator material,
applying the fluoropolymer composition of the invention onto one or two sides of the separator or parts thereof,
removing the solvent.

The fluoropolymer composition may be applied to one side of the separator material at a time or, in another embodiment, both sides simultaneously.

One side of the separator material may be coated at a time with the fluoropolymer composition of the present invention. The coated separator is then dried by evaporation of the solvents to form a porous fluoropolymer coating on one side of the separator material. After coating the first side, the same process is used again to coat the second side of the separator.

In a preferred embodiment, the separator may be coated on both sides simultaneously by running the separator material through a dipping bath of the fluoropolymer composition. The coated separator material is then dried by evaporation.

After drying, a porous coating of fluoropolymer on the separator is obtained.

The present invention also provides a process for preparing a battery involving the separator coated according to the invention.

Electrochemical cells particularly lithium batteries in accordance with the present invention may be manufactured using the porous coated separator together with other electrochemical cell components.

The three primary functional components of a lithium-ion battery are the anode, cathode, and electrolyte. The anode of a conventional lithium-ion cell is made from carbon (graphite). The cathode is a metal oxide (for example cobalt or manganese dioxide). The electrolyte is typically a mixture of organic solvents containing complexes of lithium ions.

Sample liquid electrolyte compositions for lithium ion cells in accordance with the present invention may include solvents such as propylene carbonate, ethylene carbonate, diethyl carbonate, dimethyl carbonate, ethyl methyl carbonate, dipropyl carbonate, dimethyl sulfoxide, acetonitrile and combinations thereof, a lithium salt having $Li^+$ as the cation and one of $PF^{6-}$, $ASF^{6-}$, $BF^{4-}$, $ClO^{4-}$, $CF_3SO^{3-}$, $N(CF_3SO_2)^{2-}$ as the anion.

Briefly, the present invention provides an electrochemical cell fabrication process wherein a fluoropolymer is applied to a porous battery separator material.

Fluoropolymer compositions in accordance with the present invention are formulated with high boiling point solvents which have good HSE profiles to dissolve the fluoropolymer and coat it on the separator.

Fluoropolymer material such as PVDF may also be used as binder materials used in the cathode and anode electrode slurry making process for lithium-ion batteries. A cathode electrode is typically made by mixing active material powder, binder powder, solvent and additives into a slurry or paste and pumping this slurry to a coating machine. An anode electrode is made similarly by typically mixing graphite as the active material, together with the binder, solvent and additives into slurry or paste and pumping this slurry to a coating machine. The coating machines may spread the mixed slurry or paste on both sides of the foils for the cathode and for the anode. The coated foil is subsequently calendared to make the electrode thickness more uniform, followed by a slitting operation for proper electrode sizing.

The invention also concerns then the use of the composition as a binder material used in the cathode and anode electrode slurry making process for lithium-ion batteries.

Examples of implementation of the invention are given hereinafter. These examples are given by way of indication and are not limiting in nature.

EXPERIMENTAL PART

Comparative Example 1

9.1% in weight of PVDF marketed by FLTCO (Sinochem) was mixed with 45.45% of dimethylsulphoxide (DMSO) and 45.45% of Rhodiasolv® IRIS (Rhodia)—a diester solvent. The components were mixed and heated up until the temperature reached 60° C. The solution became transparent in 15 min. The solution was then cooled down to room temperature. No gelling was observed. The viscosity of solution at room temperature was measured about 600 cp. The solution gelated after keeping at room temperature for 6 days.

Comparative Examples 2.1

9.1% in weight of PVDF marketed by FLTCO (Sinochem) was mixed with 90.9% of Rhodiasolv® Polarclean (Rhodia). The components were mixed at room temperature. The mixture did not become transparent solution after more than 30 min of stirring. The mixture kept turbid.

Comparative Examples 2.2

9.1% in weight of PVDF marketed by FLTCO (Sinochem) was mixed with 90.9% of Rhodiasolv® Polarclean (Rhodia). The components were mixed and heated up until the temperature reached 40° C. The mixture did not become transparent solution after more than 30 min of stirring. The mixture kept turbid.

Comparative Examples 2.3

9.1% in weight of PVDF marketed by FLTCO (Sinochem) was mixed with 90.9% of Rhodiasolv® Polarclean (Rhodia). The components were mixed and heated up until the temperature reached 60° C. The solution became semi-transparent in 30 min. The solution was then cooled down to room temperature. No gelling was observed. The viscosity of solution at room temperature was measured about 900 cp. The solution gelated after keeping at room temperature for 1 day.

Comparative Examples 2.4

9.1% in weight of PVDF marketed by FLTCO (Sinochem) was mixed with 90.9% of Rhodiasolv® Polarclean (Rhodia). The components were mixed and heated up until the temperature reached 70° C. The solution became semi-transparent in 20 min. The solution was then cooled down to room temperature. No gelling was observed. The viscosity of solution at room temperature was measured about 900 cp. The solution gelated after keeping at room temperature for 1 day.

Inventive Example 3.1

9.1% in weight of PVDF marketed by FLTCO (Sinochem) was mixed with 45.45% of dimethylsulphoxide (DMSO) and 45.45% of Rhodiasolv® Polarclean (Rhodia). The components were mixed at room temperature. The mixture did not become transparent after more than 30 min of stirring. The mixture kept turbid.

Inventive Example 3.2

9.1% in weight of PVDF marketed by FLTCO (Sinochem) was mixed with 45.45% of dimethylsulphoxide (DMSO) and 45.45% of Rhodiasolv® Polarclean (Rhodia). The solution was mixed and heated up until the temperature reached about 40° C. The solution became semi-transparent in 30 min. The solution was then cooled down to room temperature. No gelling was observed. The viscosity of solution at room temperature was measured about 824 cp. The solution gelated after keeping at room temperature for 2 days.

Inventive Example 3.3

9.1% in weight of PVDF marketed by FLTCO (Sinochem) was mixed with 45.45% of dimethylsulphoxide (DMSO) and 45.45% of Rhodiasolv® Polarclean (Rhodia). The solution was mixed and heated up until the temperature reached about 60° C. The solution became transparent in 10 min. The solution was then cooled down to room temperature. No gelling was observed. The viscosity of solution at room temperature was measured about 900 cp. The solution did not gelate after keeping at room temperature for 30 days.

Inventive Example 3.4

9.1% in weight of PVDF marketed by FLTCO (Sinochem) was mixed with 45.45% of dimethylsulphoxide (DMSO) and 45.45% of Rhodiasolv® Polarclean (Rhodia). The solution was mixed and heated up until the temperature reached about 70° C. The solution became semi-transparent in 10 min. The solution was then cooled down to room temperature. No gelling was observed. The viscosity of solution at room temperature was measured about 886 cp. The solution did not gelate after keeping at room temperature for 30 days.

What is claimed is:

1. A composition, notably for solubilizing a fluoropolymer comprising:
    a solvent blend comprising:
        a) at least one Compound of formula (I):

$$R^1C(=O)NR^2R^3 \qquad (I)$$

wherein:
        $R^1$ is an aliphatic saturated group, that can be linear or branched, having 1 to 6 carbon atoms, and substituted by one or more functional groups selected from a group consisting of —C(=O)OR and —C(=O)NR$^4$R$^5$, R being an alkyl group having 1 to 6 carbon atoms, and $R^4$ and $R^5$, identical or different, being methyl or ethyl groups;
        $R^2$ and $R^3$, identical or different, being methyl or ethyl groups;
        b) dimethylsulfoxide (DMSO).

2. The composition according to claim 1, the compound of formula (I) is MeO(O=)C—Z—C(=O)NR$^2$R$^3$, wherein Z is a linear or branched divalent alkylene group comprising 2 to 5 carbon atoms and $R^2$ and $R^3$ are previously defined.

3. The composition according to claim 1, the compound of formula (I) is a blend comprising:
    a compound of formula (I) wherein $R^1$ is —CH(CH$_2$—CH$_3$)—CH$_2$—C(=O)OMe,
    a compound of formula (I) wherein $R^1$ is —CH$_2$—CH(CH$_2$—CH$_3$)—C(=O)OMe,
    a compound of formula (I) wherein $R^1$ is —CH(CH$_3$)—CH$_2$—CH$_2$—C(=O)OMe, and
    a compound of formula (I) wherein $R^1$ is —CH$_2$—CH$_2$—CH(CH$_3$)—C(=O)OMe.

4. The composition according to claim 3, wherein said blend further comprises a compound of formula (I) wherein $R^1$ is —(CH$_2$)$_4$—C(=O)OMe.

5. The composition according to claim 1, wherein said compound of formula (I) is R$^4$R$^5$NC(=O)—Z—C(O)NR$^2$R$^3$, wherein Z is a linear or branched divalent alkylene group comprising 2 to 5 carbon atoms and $R^2$, $R^3$, $R^4$ and $R^5$ are previously defined.

6. The composition according to claim 1, wherein said compound of formula (I) is a blend of:
    RO(O=)C—Z—C(=O)NR$^2$R$^3$; and
    R$^4$R$^5$NC(=O)—Z—C(=O)NR$^2$R$^3$,
    wherein Z is a linear or branched divalent alkylene group comprising 2 to 5 carbon atoms and R, $R^2$, $R^3$, $R^4$, and $R^5$ are previously defined.

7. The composition according to claim 1, wherein the weight ratio between the compound of formula (I) and DMSO is of from 1/99 to 99/1.

8. The composition according to claim 1, further comprising a fluoropolymer solubilized in the solvent blend.

9. The composition according to claim 1, wherein the fluoropolymer is polyvinylidene fluoride (PDVF) and copolymer of vinylidene fluoride with comonomers hexafluoropropylene (HFP) and/or chlorotrifluoroethylene (CTFE).

10. The composition according to claim 9, wherein the amount of fluoropolymer is of from 0.1 to 15% by weight.

11. The composition according to claim 1, wherein $R^1$ is a group of formula —Z—C(=O)OR', with Z a linear or branched divalent alkylene group comprising 2 to 5 carbon atoms and R' is an alkyl group comprising 1 to 4 carbon atoms.

* * * * *